Sept. 29, 1936.  C. W. SMITH  2,055,509
LIQUID DISPENSING DEVICE
Filed Oct. 22, 1934

Inventor:
Cecil W. Smith.
By George E. Mueller
Att'y.

Patented Sept. 29, 1936

2,055,509

UNITED STATES PATENT OFFICE 2,055,509

LIQUID DISPENSING DEVICE

Cecil W. Smith, Waterman, Ill.

Application October 22, 1934, Serial No. 749,423

16 Claims. (Cl. 120—69)

My invention relates in general to liquid containers, and particularly to a liquid dispensing device including a main storage chamber and a supplementary liquid dispensing well supported therein.

Attempts have been made in the past, and particularly with respect to ink bottles, to provide an enlarged liquid storage chamber and a supplementary dispensing well adjacent the opening in the ink bottle, which may be filled from the main storage chamber and provide a small quantity of the liquid in readily available position, thus in effect raising the level of the ink in the bottle and eliminating the possibility of spilling the liquid or otherwise soiling a pen to be dipped into said ink or filled therefrom. The devices of the prior art designed to provide the result are so complicated and expensive as to make the entire device impractical, or they operate with such irregularity as to make them highly unsatisfactory.

It is an object of my invention to provide an improved liquid dispensing device.

A further object is to provide an ordinary liquid container and a supplementary dispensing well supported therein which may be readily filled upon tilting of the container.

A still further object is to provide a supplementary dispensing well for assembly in the neck opening of an ordinary liquid container which will act to raise the level of the liquid in the container and make a smaller measured quantity of the liquid readily accessible at the mouth of the container.

One of the features of my invention is the provision of a structure which will accomplish these results for a certainty in an inexpensive, sturdy, and readily assembled device.

Other objects and features of my invention will be apparent from the following description taken with the drawing, in which.

In practicing my invention I provide a liquid dispensing device including a main storage chamber having a neck opening and a threaded cap therefor with a supplementary liquid dispensing well having yieldable supporting ribs for frictionally engaging the neck opening of the container slightly below the upper edge thereof and acting to space the well away from said neck to permit the ready flow of liquid from the main storage chamber to the cap upon the tilting of the container, whereby to discharge the liquid into, and retain the same in a measured quantity within the well upon restoring the container to its normal upright position.

Figure 1:
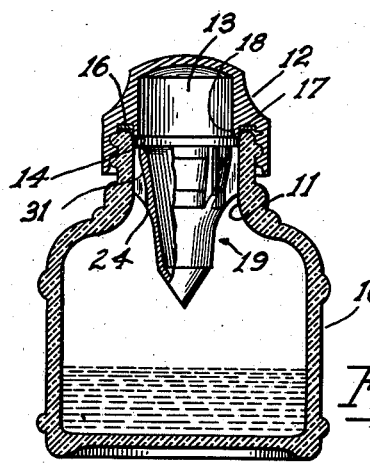
Fig. 1 is a sectional view in actual size of a liquid container with a supplementary dispensing well supported in the opening thereof.
Figure 5:
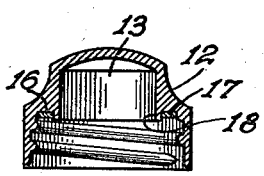
Fig. 5 is a sectional view of the cap for the liquid container.

Referring now to the drawing, I utilize a bottle 10 of the size and shape ordinarily used for carrying ink, having a neck opening 11 threaded on the outside thereof to receive a correspondingly threaded cap 12 to close the top opening. As illustrated particularly in Figs. 1 and 5, the cap 12 has a raised top with a cavity 13 therein to provide a substantial chamber above the top of the opening 14 of the bottle. As will be understood, however, from the following description of my invention, I may also employ a threaded cap whose inside top is raised only slightly above the edge 14 rather than the enlarged cavity 13 as illustrated.

To provide a leak-proof seal between the cap and bottle I provide an annular channel 16 above the threaded portion of the cap to carry a paper or composition washer 17. An annular flange 18 on the inside of the channel prevents the washer 17 from spreading unduly upon repeated tightening of the cap upon the bottle. I have found that without this channel for the washer the latter becomes compressed and spread out so that it is of practically no value in preventing leaking at the top when the bottle is tipped, as will be hereinafter explained.

As has been pointed out and is well-known in the use of liquid dispensers for ink, medicine and the like, difficulty is encountered in reaching the liquid when the supply is low and the liquid level is near the bottom of the container. Furthermore, difficulty is often encountered in dispensing the liquid when the container is entirely full because of the large body of liquid adjacent the opening of the container. This difficulty is particularly apparent in filling a fountain pen from an ink bottle, or in filling a medicine dropper from a medicine bottle. As has been explained, the prior art devices have not overcome this difficulty in a practical manner.

Figure 2:
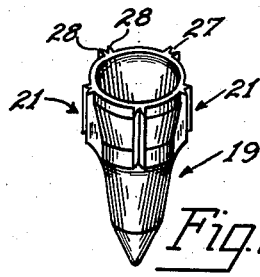
Fig. 2 is a slightly enlarged perspective view of the supplementary dispensing well itself.

In the commercial embodiment of my invention I employ a supplementary dispensing well 19, which is frustro-conical in shape as shown particularly in Fig. 2. The well is open at the top and tapers in a slightly irregular line to a closed point at the bottom thereof.

I have successfully employed a molded phenolic resin compound member having a plurality of ribs 21 spaced apart circumferentially, and extending vertically on the outside of the member 19 adjacent the top. The ribs are integral with the wall of the body member which tapers downwardly in a substantially straight line on its inside surface 22 and extends downwardly on the outside surface in a slightly irregular line from a bevelled edge at the top opening 23 through an enlarged reinforcing portion 24 or annular shoulder adjacent the bottom of the rib 21 and then downwardly through a wall of uniform width to the pointed tip 26 at the bottom of the well.

Figure 3:
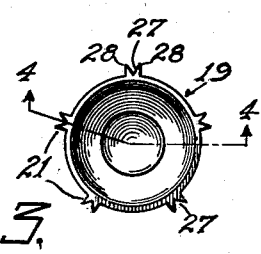
Fig. 3 is a top plan view of the well of Fig. 2 and still further enlarged.
Figure 4:
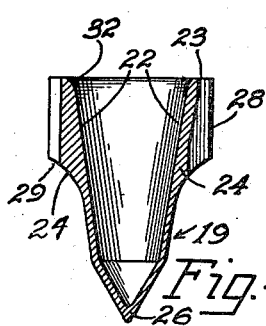
Fig. 4 is a sectional view along the line 4—4 of Fig. 3.

The dispensing well 19 is supported in the bottle 10 by the frictional engagement of the ribs 21 with the inside surface of the neck 11. In assembling the same the well is pushed downwardly through the opening in the bottle to the position shown in Fig. 1 with its upper edge slightly below the top edge or opening 14 of the bottle. The well is supported primarily by the rib construction which includes a longitudinal passage 27 of uniform depth over the length of the rib, with fine feather edge walls 28 on each side of the passage. As will be noted in Fig. 3 particularly, the passage is not as deep as the rib even at the top of the well, and as it is uniform in depth it is spaced farther from the tapered wall of the well as it extends downwardly to give added strength to the rib.

As the well is pushed downwardly in the bottle the entering edge 29 of each of the ribs 21 engages the edge 14 of the bottle. The entering edge 29 is bevelled or tapered at a slightly greater angle than the remainder of the wall of the well, but at the same curvature as that of the annular reinforcing shoulder 24 and the structure of each provides reinforcement for the well to prevent breakage as said well is pushed into the neck. However, as the well is pushed down a further distance the edge 14 engages the fine feather edge walls 28 on each of the ribs, and as the circumference of the outer edges of these ribs is slightly greater than the inside circumference of the neck 11, the feather edges either bend slightly or break, so that the well will actually go into the neck and at the same time adapt itself to any irregularities in size or contour of the opening 11. As a matter of fact, in the commercial embodiment of the invention it has been found that there is a very slight variation in the inside circumference of the neck of the bottles 10 although they are all prepared in supposedly identically sized molds. The solid portion of the rib behind the passage 27 limits the amount of breaking or bending in the feather edges 28 so that when the well has been pushed to the position shown in Fig. 1 the ribs tightly engage the wall of the opening and hold the well rigidly therein. The edges 28 do not bend or break down to the bottom of the passage so that they space the well from the neck to provide a small vent over the length of the passage.

The rib construction not only assists in spacing and retaining the well in the neck 11, but also provides nozzle-like passages 31 between the well and the neck, and defined by intervening ribs 21. As will be noted particularly in Fig. 1, the passage 31 tapers from an enlarged opening from the storage chamber to a smaller opening or outlet at the top of the well to facilitate the flow of the liquid from the storage chamber as will be hereinafter explained.

In the use of the complete device, and particularly the supplementary liquid dispensing well, the cap 12 is screwed down tightly onto the bottle with the washer 17 providing a seal between said cap and the edge 14 of the bottle, and the bottle is turned upside down or tilted to permit flow of the liquid from the storage chamber in the bottom of the bottle into the cavity 13 of the cap. The liquid flows over the tapered outer wall of the well through the passages 31. When the bottle is returned to its normal vertical position the liquid flows from the cap over the bevelled funnel-like wall portion 32 on the inside of the well to fill the same. The cap 12 is then removed from the bottle and the liquid in the well is available for use. In the commercial embodiment of the invention I provide five ribs 21, and I have found that an odd number of ribs provides more uniform seating or positioning in the neck than an even number, and consequently provides a more rapid flow of liquid from the storage chamber into the cap and of course to the dispensing well.

The supplementary well has found its greatest application in a dispensing device for ink, and is designed to hold a quantity of ink substantially equal to the capacity of the ordinary fountain pen. The interior of the well is tapered and extended to a pointed tip so that the fountain pen may be inserted in a manner that, upon the filling operation, practically empties the contents of the well. The body of the pen or gripping portion, however, remains above the ink level to eliminate the dirty, messy, filling operation prevalent when filling a fountain pen from the ordinary bottle. Furthermore, by this structure the pen may be filled even though the quantity of liquid in the bottle is not of a sufficient depth to immerse the pen, for the smaller capacity of the well provides the necessary depth.

Of course I do not limit the use of my invention to ink dispensing bottles, for it is readily understood that the invention may be embodied in other liquid dispensing devices and particularly in medicine bottles. Furthermore, although I have described the well as being manufactured from a phenolic resin compound, it is understood that I may also employ hard rubber or substantially hard rubber or other moldable compounds of this general constituency which will maintain their shape during the assembly of the well in the bottle and subsequently during the use of the dispensing device.

I claim:

1. In a liquid dispensing device, a main storage chamber having a neck opening, a supplementary dispensing well supported in said neck opening, said dispensing well including a hollow body member, a plurality of spaced supporting ribs extending vertically on the outside surface of the well, with yieldable means along the outside edge of each of the ribs.

2. In a liquid dispensing device, a main storage chamber having a neck opening, a supplementary dispensing well supported in said neck opening, said dispensing well including a substantially frustro-conical hollow body member, a plurality of spaced supporting ribs extending vertically on the outside surface of the well, with yieldable means along the outside edge of each of the ribs.

3. In a liquid dispensing device, a main storage chamber having a neck opening, a supplementary dispensing well supported in said neck opening, said dispensing well including a hollow body member, a plurality of spaced supporting ribs extending vertically on the outside surface of the well, a longitudinal groove in each of the ribs, and feather edge walls on each side of the groove.

4. In a liquid dispensing device, a main storage chamber having a neck opening, a supplementary dispensing well supported in the neck opening, said dispensing well including a hollow body member having an outer surface tapering downwardly and inwardly from the top to the bottom thereof and receding from the neck opening from the top of said well downwardly, and a plurality of spaced supporting ribs on the outside of the well to engage the inside wall of the neck at points spaced along each rib and support the well therein.

5. In a liquid dispensing device, a main storage chamber having a neck opening, and a supplementary dispensing well, with said dispensing well having an odd number of supporting ribs widely spaced apart on the outside surface thereof for frictional engagement with the wall of the neck to retain the well therein, no two of said ribs being diametrically opposed.

6. In a liquid dispensing device, a main storage chamber having a neck opening and a supplementary dispensing well, with said dispensing well having five supporting ribs uniformly spaced apart on the outside surface thereof for frictional engagement with the wall of the neck to retain the well therein.

7. In a liquid dispensing device, a main storage chamber having a neck opening, a supplementary dispensing well supported in said neck, and a passage between the dispensing well and the wall of the neck, with said passage having a narrow opening at the top and gradually increasing in width toward the bottom.

8. In a liquid dispensing device, a main storage chamber having a neck opening, a supplementary dispensing well supported in said neck, axially extending supporting ribs spaced about the outside of the well and engaging the wall of the neck to provide a plurality of passages between the well and neck, with each of said passages having a narrow opening at the top and gradually increasing in width toward the bottom thereof.

9. In a liquid dispensing device, a main storage chamber having a neck opening, a supplementary dispensing well supported in the neck, axially extending supporting ribs spaced about the outside of the well and engaging the wall of the neck to provide a comparatively wide passage between adjacent spaced ribs, and a small groove extending longitudinally in each of said ribs.

10. A liquid dispensing well for insertion in a liquid container, including a hollow body member having an outside surface tapering gradually inwardly in a slightly irregular line from the top to the bottom of the well, an annular integral reinforcing shoulder on the outside surface between the top and bottom of the well, and a plurality of axially extending ribs spaced apart on the outside surface and projecting further from said surface at their lower ends than at their upper ends.

11. In a liquid dispensing device, a main storage chamber having a neck opening, a removable cap to close said neck opening having a cavity in the roof thereof, means for carrying a sealing washer in said cap to provide a leak-proof connection between the neck edge and cap, a supplementary dispensing well supported in said neck opening, said dispensing well including a hollow body member, a plurality of spaced supporting ribs extending vertically on the outside surface of the well, and yieldable means on the ribs for engaging the inside wall of the neck to support the well therein, and said ribs acting to space the body member away from the neck wall to provide passage for the flow of liquid from the storage chamber to the cap, and into the dispensing well.

12. In a liquid dispensing device, a main storage chamber having a neck opening, and a supplementary dispensing well, with said dispensing well having an odd number of supporting ribs widely spaced apart on the outside surface thereof, each of said ribs having two feather edges for frictional engagement with the wall of the neck to retain the well therein, no two of said ribs being diametrically opposed.

13. In a liquid dispensing device, a main storage chamber having a neck opening and a supplementary dispensing well, with said dispensing well having five supporting ribs uniformly spaced apart on the outside surface thereof, each of said ribs having two feather edges for frictional engagement with the wall of the neck to retain the well therein.

14. In a liquid dispensing device, a main storage chamber having a neck opening, a supplementary dispensing well supported in said neck, and a passage between the dispensing well and the wall of the neck, with said passage having a narrow opening at the top and gradually increasing in width toward the bottom, said dispensing well having five supporting ribs uniformly spaced apart on the outside surface thereof, each of said ribs having two feather edges for frictional engagement with the wall of the neck to retain the well therein.

15. In a liquid dispensing device, a main storage chamber having a neck opening, a supplementary dispensing well supported in said neck, and a passage between the dispensing well and the wall of the neck, with said passage having a narrow opening at the top and gradually increasing in width toward the bottom, said well being internally bevelled at its top to facilitate the flow of ink from said cavity into said well.

16. A liquid dispensing well for insertion in the neck opening of a liquid container including a hollow body member, a plurality of spaced supporting ribs extending vertically on the outside surface of the well, a longitudinal groove in each of the ribs, and feather edge walls on each side of the groove.

CECIL W. SMITH.